United States Patent
Qin et al.

(10) Patent No.: US 9,654,768 B2
(45) Date of Patent: May 16, 2017

(54) COMPUTER DEVICE WITH POWER-CONSUMPTION MANAGEMENT AND METHOD FOR MANAGING POWER CONSUMPTION OF COMPUTER DEVICE

(75) Inventors: Peng Qin, Beijing (CN); Lin Du, Beijing (CN); Guanghua Zhou, Beijing (CN)

(73) Assignee: Thomson Licensing (FR)

( * ) Notice: Subject to any disclaimer, the term of this patent is extended or adjusted under 35 U.S.C. 154(b) by 255 days.

(21) Appl. No.: 14/367,963

(22) PCT Filed: Dec. 23, 2011

(86) PCT No.: PCT/CN2011/084552
§ 371 (c)(1),
(2), (4) Date: Jun. 23, 2014

(87) PCT Pub. No.: WO2013/091245
PCT Pub. Date: Jun. 27, 2013

(65) Prior Publication Data
US 2014/0347454 A1    Nov. 27, 2014

(51) Int. Cl.
*H04N 13/04*    (2006.01)
*G01S 13/00*    (2006.01)
(Continued)

(52) U.S. Cl.
CPC ..... *H04N 13/0484* (2013.01); *G02B 27/0093* (2013.01); *G02B 27/2214* (2013.01); *G06F 1/3231* (2013.01); *G06F 1/3265* (2013.01); *G06F 3/013* (2013.01); *H04N 13/0055* (2013.01); *H04N 13/0404* (2013.01); *H04N 13/0468* (2013.01); *H04N 13/0497* (2013.01);
(Continued)

(58) Field of Classification Search
CPC ........... H04N 13/0484; H04N 13/0497; H04N 13/0404; G02B 27/2214
See application file for complete search history.

(56) References Cited

U.S. PATENT DOCUMENTS 4,987,487 A    1/1991    Ichinose et al.
6,593,957 B1    7/2003    Christie
(Continued)

FOREIGN PATENT DOCUMENTS

| CN | 101840265 | 9/2010 |
| EP | 2180716 | 9/2009 |

(Continued)

OTHER PUBLICATIONS

Yi Etal., "Moving Parallax Barrier Design for Eye-Tracking Autostereoscopic Displays", 3DTV Conference, Istanbul, Turkey, May 28, 2008, pp. 165-168.
(Continued)

*Primary Examiner* — Tsion B Owens
(74) *Attorney, Agent, or Firm* — Jack Schwartz & Associates, PLLC (57) ABSTRACT

The present invention relates to a computer device comprising a detector for detecting a user's eye and a processor. The processor is configured to determine if the position of the user's eye is kept in a zone for a first time period, and if the position of the user's eye is kept in the zone for the first time period, suspend for a second time period detecting the user's eye and determining the position of the user's eye.

9 Claims, 6 Drawing Sheets

(51) Int. Cl.
*G02B 27/22* (2006.01)
*G02B 27/00* (2006.01)
*G06F 1/32* (2006.01)
*G06F 3/01* (2006.01)
*H04N 13/00* (2006.01)

(52) U.S. Cl.
CPC ....... *Y02B 60/1242* (2013.01); *Y02B 60/1289* (2013.01)

(56) References Cited

U.S. PATENT DOCUMENTS

| | | | |
|---|---|---|---|
| 7,091,471 B2 | 8/2006 | Wenstrand et al. | |
| 8,643,680 B2 * | 2/2014 | Baldwin | G06F 3/013 345/156 |
| 8,913,004 B1 * | 12/2014 | Bozarth | G06K 9/00604 345/156 |
| 9,196,239 B1 * | 11/2015 | Taylor | G06F 3/00 |
| 2007/0188667 A1 | 8/2007 | Schwerdtner | |
| 2008/0231767 A1 | 9/2008 | Lee | |
| 2009/0160541 A1 | 6/2009 | Liu et al. | |
| 2010/0079508 A1 * | 4/2010 | Hodge | G06F 3/013 345/697 |
| 2010/0241992 A1 | 9/2010 | Zhang | |
| 2010/0295958 A1 | 11/2010 | Larsson et al. | |
| 2011/0063421 A1 | 3/2011 | Kubota | |
| 2011/0298702 A1 * | 12/2011 | Sakata | G06F 3/013 345/156 |
| 2012/0083312 A1 * | 4/2012 | Kim | G02B 13/001 455/556.1 |
| 2014/0125585 A1 * | 5/2014 | Song | G06F 3/013 345/156 |

FOREIGN PATENT DOCUMENTS

| | | |
|---|---|---|
| GB | 2294350 | 4/1996 |
| JP | 02050145 | 2/1990 |
| JP | 3040692 | 2/1991 |
| JP | 2005164916 | 6/2005 |
| JP | 2008139600 | 6/2008 |
| JP | 2010117619 | 5/2010 |
| JP | 2010250789 | 11/2010 |
| JP | 2011064894 | 3/2011 |
| KR | 2010044062 | 4/2010 |
| WO | WO2009/136235 | 11/2009 |

OTHER PUBLICATIONS

Chinese Application No. 201180075844.7, Office Action, dated Apr. 6, 2016.

* cited by examiner

Fig.8

COMPUTER DEVICE WITH POWER-CONSUMPTION MANAGEMENT AND METHOD FOR MANAGING POWER CONSUMPTION OF COMPUTER DEVICE

This application claims the benefit, under 35 U.S.C. §365 of International Application PCT/CN2011/084552, filed Dec. 23, 2011, which was published in accordance with PCT Article 21(2) on Jun. 27, 2013 in English.

FIELD OF THE INVENTION

The present invention relates to a computer device with power-consumption management and a method for managing power-consumption of a computer device.

BACKGROUND OF THE INVENTION

Today, computer devices such as smart-phones and PMPs (Personal Media Players) have become popular. With the development of 3D technology, more and more these mobile computer devices begin to support 3D displays. Such a mobile computer device would have a 3D display the screen diagonal of which is around 10 inches and would employ auto-stereoscopic display technology including parallax barrier technology and lens array technology, for example.

Figure 1:
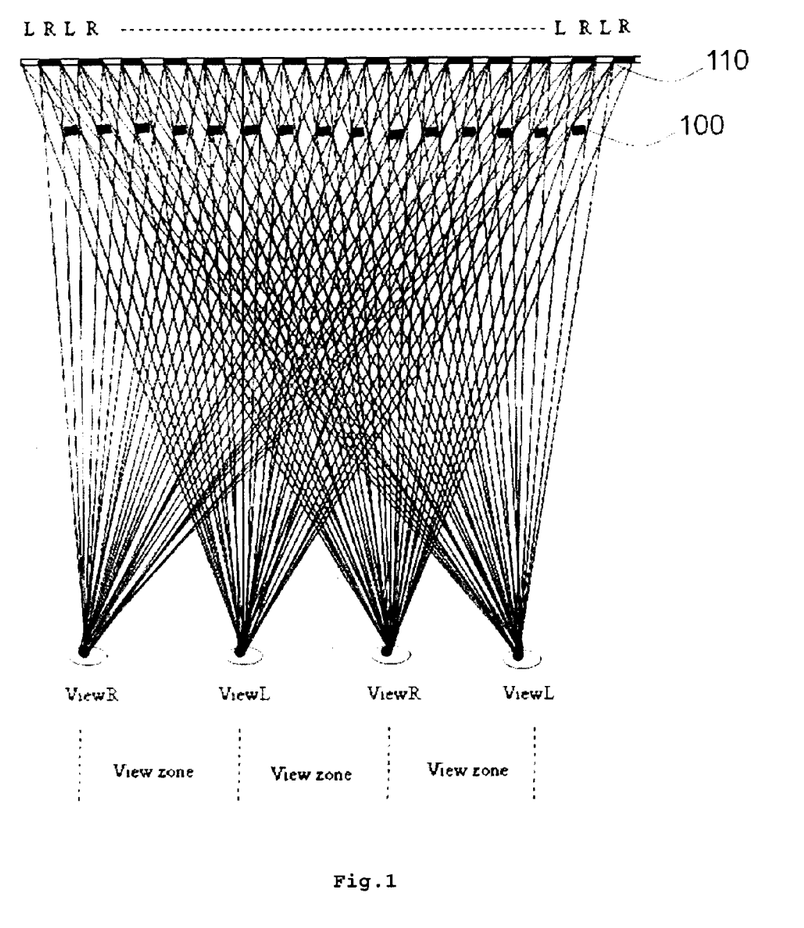
FIG. 1 illustrates a display device using parallax barrier technology.
Figure 2A:
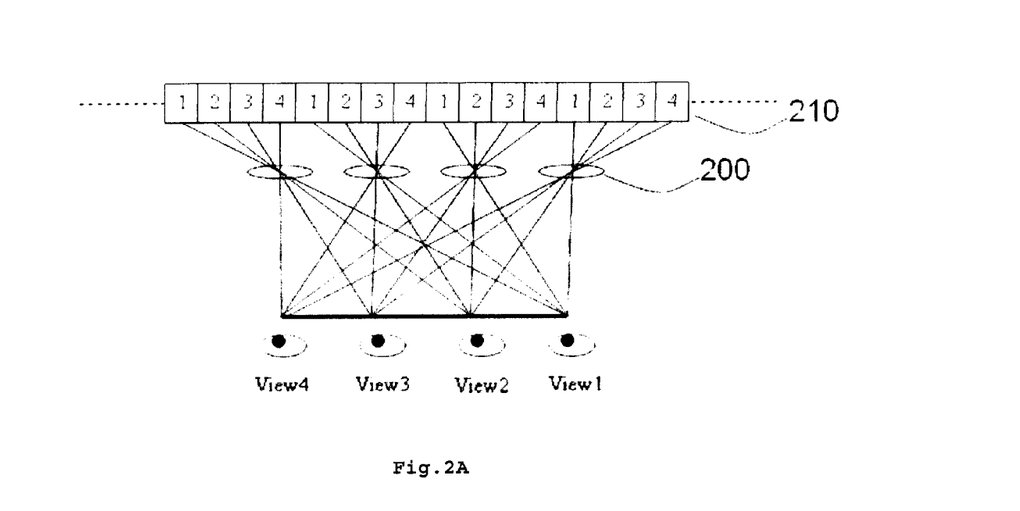
FIGS. 2A and 2B illustrate a display device using lens array technology.
Figure 2B:
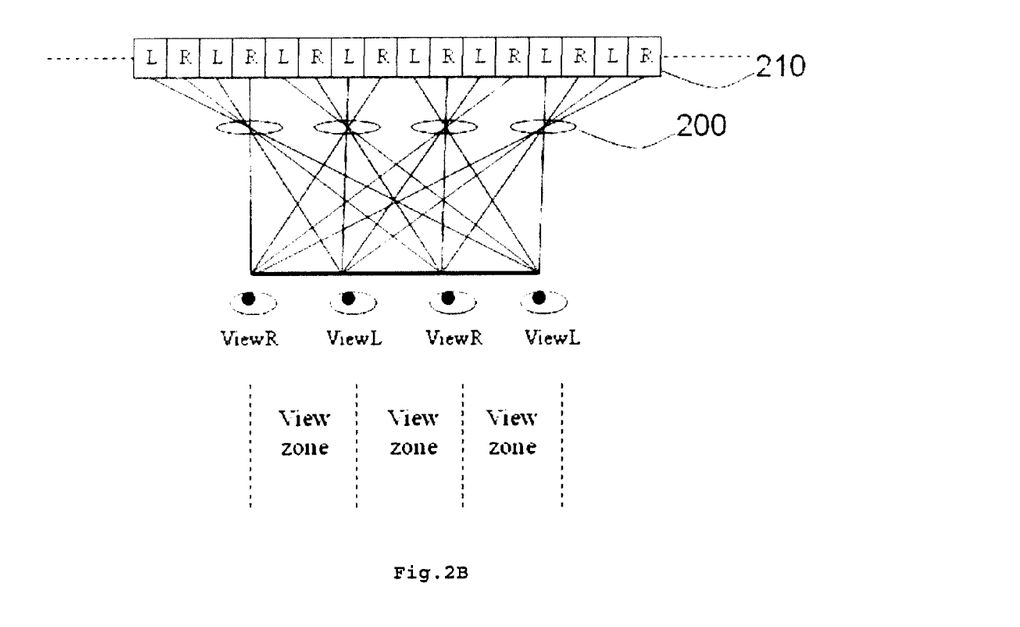

FIG. 1 illustrates a display device using parallax barrier technology and FIGS. 2A and 2B illustrate a display device using lens array technology.

In the example shown in FIG. 1, a parallax barrier 100 is arranged in front of a display screen 110 so that viewer's left and right eyes can see different left and right views, respectively.

In the example shown in FIG. 2A, a lens array 200 is arranged in front of an LCD (Liquid Crystal Display) display screen 210. The lens array 200 includes a number of lenses and each lens is configured so that it distributes images from four different sub-pixels to four different viewpoints, respectively.

In the lens array technology shown in FIGS. 2A and 2B, if the left and right views are displayed on the LCD screen 210 as illustrated in FIG. 2B, a plurality of view zones for 3D representation are produced.

As can be seen in FIGS. 1 and 2B, "fuzzy zones", in which the left eye will see the right view and right eye will see the left view, are produced in both cases. A "fuzzy zone" is arranged alternately with a "normal zone" in which the left eye will see the left view and right eye will see the right view. Such a fuzzy zone can be resolved by switching the left and right views to be presented by the pixels of the display device when it is detected that eyes of a viewer enter into the fuzzy zone, then the viewer can see the corrected 3D representation on the display device.

As described above, in auto-stereoscopic display device, it would be appreciated if the 3D content to be presented on the display device can be seen by a viewer in a wide range of the viewpoint in order to give viewer a better viewing experience. For this purpose, a camera or any other sensor may be used for detecting the viewer's eye position with an eye tracking technique, for example. If it is detected that the viewer's eyes are in the "fuzzy zone", the left and right views to be presented by the pixels of the display device are switched so that the viewer can enjoy the 3D representation.

However, since continuously detecting the viewer's eye position with an eye tracking technique requires a high amount of calculations for the computer device, if the viewer's eye position is kept detecting while the viewer uses the computer device, large amounts of the power will be consumed for detecting the viewer's eye position.

U.S. Pat. No. 7,091,471 B2 discloses to detect presence/absence of a user's eye in order to switch a power consumption state for power management of a device. However, this reference does not mention how to manage the power consumed for detecting a user's eye position.

An aim of the present invention is to provide more efficient power management for a computer device.

SUMMARY OF THE INVENTION

According to an aspect of the present invention, there is provided a computer device comprising a detector for detecting a user's eye and a processor. The processor is configured to determine if the position of the user's eye is kept in a zone for a first time period, and if the position of the user's eye is kept in the zone for the first time period, suspend for a second time period detecting the user's eye and determining the position of the user's eye.

According to another aspect of the present invention, there is provided a method for managing power consumption of a computer device. The method comprises the steps of detecting a user's eye, determining if the position of the user's eye is kept in a zone for a first time period, and if the position of the user's eye is kept in the zone for the first time period, suspending for a second time period detecting the user's eye and determining the position of the user's eye.

BRIEF DESCRIPTION OF DRAWINGS

These and other aspects, features and advantages of the present invention will become apparent from the following description in connection with the accompanying drawings in which.

DETAIL DESCRIPTION OF PREFERRED EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be practiced without the specific details present herein.

Figure 3:
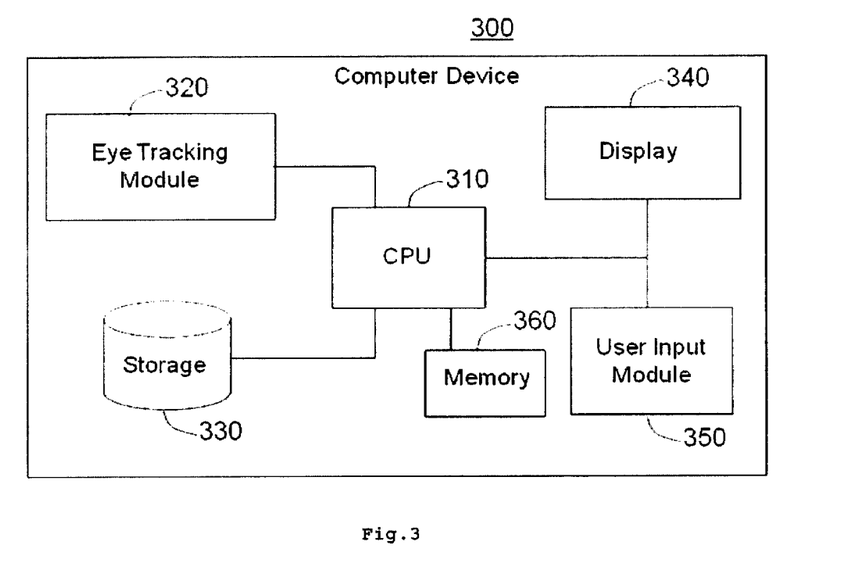
FIG. 3 is an exemplary block diagram of a computer device according to an embodiment of the present invention.

FIG. 3 illustrates an exemplary block diagram of a computer device 300 according to an embodiment of the present invention. The computer device 300 can be a smart-phone, PMP (Personal Media Player), tablet and so on. The computer device 300 comprises a CPU (Central Processing Unit) 310, an eye tracking module 320, storage 330, a display 340 and an user input module 350. A memory 360 such as RAM (Random Access Memory) is connected to the CPU 310 as shown in FIG. 3. The eye tracking module 320, storage 330, display 340 and user input module 350 is connected to the CPU 310 via I/O controller (not shown).

The eye tracking module 320 is an element for detecting an eye of a user of the device 300. The eye tracking module 320 can employ many different types of techniques for the eye tracking purpose. For example, the eye tracking module 320 can employ the Haar-like features for detecting the eye on the user's face. A person skilled in the art will recognize that the above-described technique is not only a solution for the eye tracking and that many other techniques can be used for the eye tracking.

The display 340 is configured to visually present text, image, video and any other contents to a user of the device 300. The display 340 employs a parallax barrier or lens array or any other possible element so that it can present stereoscopic 3D presentation. Also, the display 340 can be a touch-screen so that it can provide a possibility to the user to operate the device 300 on the display 340 in addition to the user input module 350.

The user input module 350 may include keys or buttons on the device 300 to input characters or commands and also comprise a function to recognize the characters or commands input with the keys or buttons. The user input module 350 can be an option if the display 340 is a touch-screen and the device 300 is configured so that characters or commands can be input on the display 340.

The storage 330 is configured to store software programs and data for the CPU 310 to drive and operate the eye tracking module 320, the storage 330, the display 340 and the user input module 350 as will be explained below. The storage 330 also stores the contents such as 3D video contents to be presented on the display 340.

The memory 360 is used to store intermediate data which are generated or used by the CPU 310.

Figure 4:
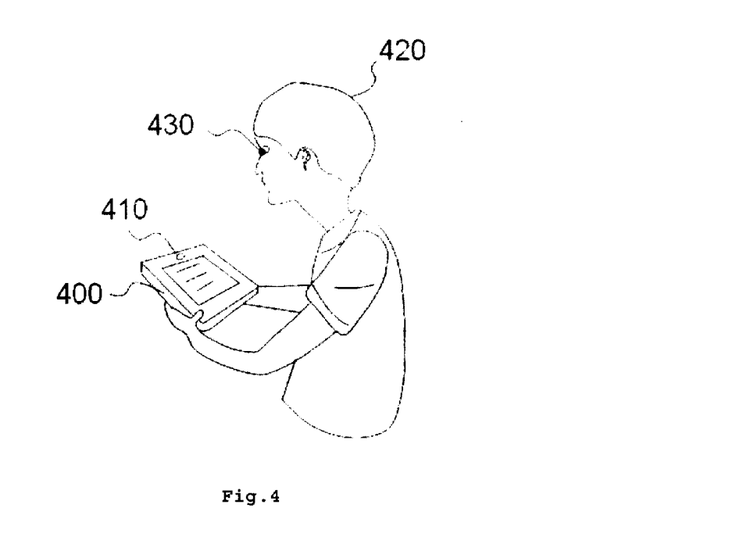
FIG. 4 illustrates a basic environment of the use of the computer device according to an embodiment of the present invention.

FIG. 4 illustrates a basic environment of the use of the computer device according to an embodiment of the present invention. FIG. 4 shows that user 420 is watching content presented on the display of the computer device 400. The computer device 400 is equipped with a camera 410 for imaging the face of the user 420 to detect eyes 430 of the user 420. The camera 410 is responsible for capturing the face of the user 420 so that eyes of the user are detected by the CPU 310 by analyzing the captured image data. The camera 410 may be an element of the eye tracking module 320 shown in FIG. 3.

The computer device 400 may comprise a depth sensor (not shown) in addition to or instead of the camera 410. In this case, detecting the eyes 430 of the user 420 can be performed as follows:

When the user 420 watches the display of the device 400, it is assumed that the user's face is facing the display of the device 400, and when the user 420 watches the display screen, the position of the user's face with respect to the device 400 will be occasionally located at the position where the user's face can be captured by the depth sensor. Since the depth sensor is configured to generate a depth image, the depth sensor can be used to detect the user's face in the depth image by excluding the background from the captured depth image. Then the facial features, such as eyes, nostrils and lip-corners in the detected user's face are searched and tracked.

A top-down approach may be employed for searching the facial features. In the top-down approach, at first the facial area in the depth image is searched using a statistical color model or depth map of face, then the search process for the facial features is restricted to certain areas inside the facial area. After these facial features are found, the position of the eyes 430 of the user 420 is determined. Since it is assumed that the user's face will not move fast with respect to the display of the device 400 while the user 420 watches the display of the device 400, when the position of the facial features is detected in a video frame, the position of the facial features in the next vide frame can be predicted. The position of the eyes 430 of the user 420 also can be detected by the above-described process using the top-down approach.

Figure 5:
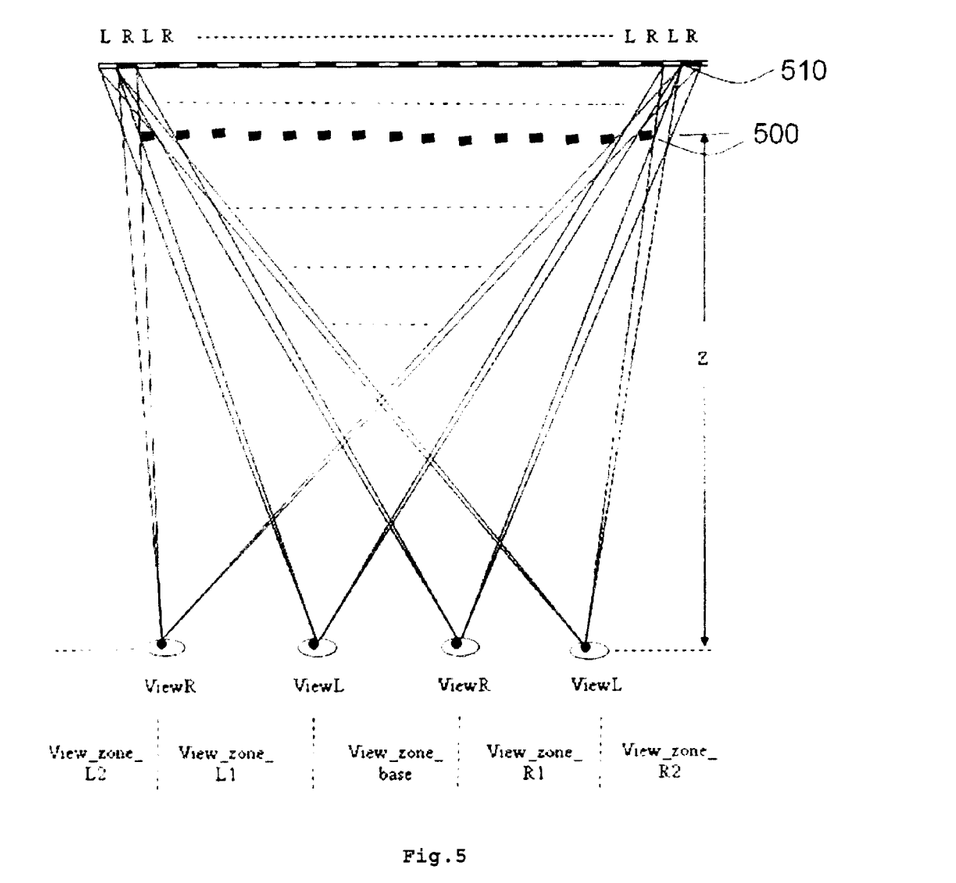
FIG. 5 illustrates view zones of the display device of the computer device, which display device uses parallax barrier technology.

FIG. 5 illustrates view zones of the display device of the computer device, which display device uses parallax barrier technology.

The view zones of the display device are determined based on the arrangements of the pixels of the display screen 510 and the arrangements of the slits of the parallax barrier 500. The parameters for the view zones of the display device can be initially stored in the storage 330 shown in FIG. 3, for example.

The view zones are defined as follows: Suppose that the optimal zone for viewing the 3D representation presented by the display device is the one in the middle, it is marked as view_zone_base. The zone at the left side of the view_zone_base is marked as view_zone_L1, the zone following this view_zone_L1 is marked as view_zone_L2, and the next successive zones will be marked as view_zone_L3, view_zone_L4 and so on. The zone at the right side of the view_zone_base is marked as view zone_R1, the zone following this view_zone_R1 is marked as view_zone_R2, and the next successive zones will be marked as view_zone_R3, view_zone_R4 and so on.

Suppose the distance between the user's eyes and the display device is Z and the width of each view zone from view_zone_L2 to view_zone_R2 is width_L2, width_L1, width_base, width_R1 and width_R2, respectively, the view zone in which the user's eyes are positioned will be determined as described below.

At first, it is detected if the distance Z is within a certain optimal distance range for viewing the display device. The certain optimal distance can be initially defined based on the size of the display device and can be stored in the storage 330, for example.

If the distance Z is within the certain optimal distance range, it is detected if the user's eyes are positioned in the view_zone_base. If the user's eyes are positioned in the view_zone_base, information indicating that the user is positioned in optimal position may be presented on the display device. The user can see optimal 3D representation on the display device in this position.

If it is detected that the user's eyes moved to the right in X cm horizontally, it is determined if the following Formula (1) is fulfilled. If the Formula (1) is fulfilled, it is determined that the user's eyes moved from the view_zone_base to the view_zone_R1.

$$X < \text{width\_base and } X > \text{width\_base}/2 \quad (1)$$

Else, it is determined if the following Formula (2) is fulfilled. If the Formula (2) is fulfilled, it is determined that the user's eyes moved from the view_zone_R1 to the view_zone_R2.

$$\text{width}\_R1/2 < (X - \text{width\_base}) < \text{width}\_R1 \quad (2)$$

The same applies to the next successive zones in the right direction.

On the other hand, if it is detected that the user's eyes moved to the left in X cm horizontally, it is determined if the Formula (1) is fulfilled. If the Formula (1) is fulfilled, it is determined that the user's eyes moved from the view_zone_base to the view_zone_L.

Else, it is determined if the following Formula (3) is fulfilled. If the Formula (3) is fulfilled, it is determined that the user's eyes moved from the view_zone_L1 to the view_zone_L2.

$$\text{width}\_L1/2 < (X - \text{width base}) < \text{width}\_L1 \quad (3)$$

The same applies to the next successive zones in the left direction.

Figure 6:
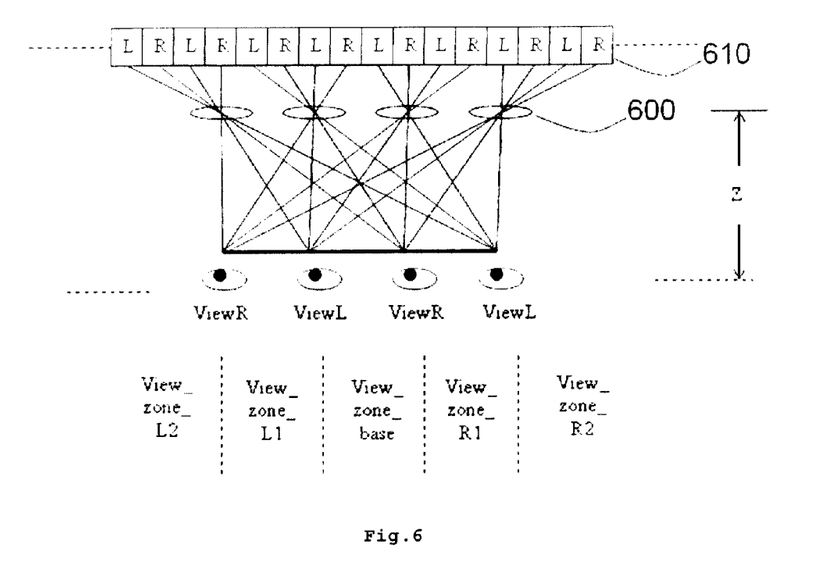
FIG. 6 illustrates view zones of the display device of the computer device, which display device uses lens array technology.

FIG. 6 illustrates view zones of the display device of the computer device, which display device uses lens array technology.

The view zones of the display device are determined based on the arrangements of the pixels of the display screen 610 and the arrangements of the lenses of the lens array 600. The parameters for the view zones of the display device can be initially stored in the storage 330 shown in FIG. 3, for example.

The view zones are defined the same manner as described with reference to FIG. 5. In the display device shown in FIG. 6, the width of each view zone is constant. It is supposed that the width W is 6.25 cm which is the normal distance between both eyes of a human.

For the display device shown in FIG. 6, the view zone in which the user's eyes are positioned will be determined as described below.

At first, it is detected if the distance Z is within a certain optimal distance range for viewing the display device.

If the distance Z is within the certain optimal distance range, it is detected if the user's eyes are positioned in the view_zone_base. If the user's eyes are positioned in the view_zone_base, information indicating that the user is positioned in optimal position may be presented on the display device. The user can see optimal 3D representation on the display device in this position.

If it is detected that the user's eyes moved to the right in X cm horizontally, it is determined if the following Formula (4) is fulfilled. If the Formula (4) is fulfilled, it is determined that the user's eyes moved from the view_zone_base to the view_zone_R1.

$$X < W \text{ and } X > W/2 \quad (4)$$

Else, it is determined if the following Formula (5) is fulfilled. If the Formula (5) is fulfilled, it is determined that the user's eyes moved from the view_zone_R1 to the view_zone_R2.

$$W/2 < (X - W) < W \quad (5)$$

The same applies to the next successive zones in the right direction.

On the other hand, if it is detected that the user's eyes moved to the left in X cm horizontally, it is determined if the Formula (4) is fulfilled. If the Formula (4) is fulfilled, it is determined that the user's eyes moved from the view_zone_base to the view_zone_L1.

Else, it is determined if the Formula (5) is fulfilled. If the Formula (5) is fulfilled, it is determined that the user's eyes moved from the view_zone_L1 to the view_zone_L2.

The same applies to the next successive zones in the left direction.

A view zone in which the user's eyes are positioned can be determined by analyzing the image captured by such as the camera 410 or the depth sensor of the eye tracking module 320. If a correlation between respective view zones and corresponding information such as size and position of the user's eyes in a captured image is stored in the storage 330, the above mentioned analysis for determining the view zone in which the user's eyes are positioned can be realized by searching in the stored correlation the view zone which corresponds to the information of the captured image.

The computer device according to the present invention is configured so that, every time it is detected that the user's eyes moved to a next view zone from the previous view zone, the left and right views to be presented by the pixels of the display device will be switched by the CPU 310 shown in FIG. 3.

The view zones include alternately arranged first and second view zones. In the first view zone, the left view to be presented to left eye of the user and the right view to be presented to right eye of the user. In the second view zone, the left view to be presented to right eye of the user and the right view to be presented to left eye of the user. In the example shown in FIGS. 5 and 6, the view_zone_base is the first view zone, the view_zone_L1 and the view_zone_R1 adjacent to the view_zone_base are the second view zone, and the view_zone_L2 and the view_zone_R2 adjacent to the view_zone_L1 and the view_zone_R1, respectively are the first view zone.

Figure 7:
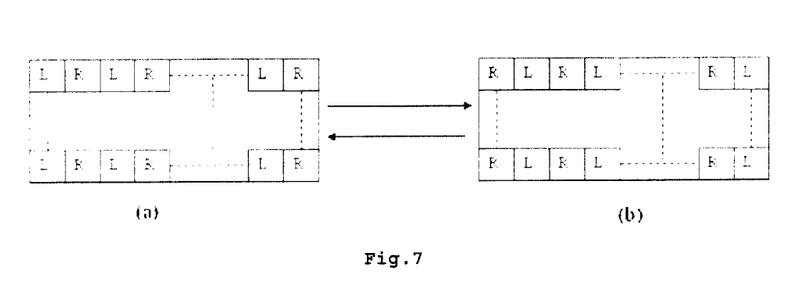
FIG. 7 shows the two different pixel arrangements of the display device.

FIG. 7 shows the two different pixel arrangements of the display device. FIG. 7(a) illustrates a normal pixel arrangement and FIG. 7(b) illustrates an alternative pixel arrangement. The normal pixel arrangement shown in FIG. 7(a) will be switched to the alternative pixel arrangement shown in FIG. 7(b) when it is detected that the user's eyes moved into the second view zone. Further, the alternative pixel arrangement shown in FIG. 7(b) will be switched to the normal pixel arrangement shown in FIG. 7(a) when it is detected that the user's eyes moved into the first view zone.

As described above, detecting the position of the user's eyes provides viewing comfort to the user of the computer device. However, lots of power will be consumed if the detecting of the position of the user's eyes is performed all the time during which the computer device is switched on. In addition to this, playback of a video content by the computer device requires some power and presenting video content on the display device also needs some power. Taking into account these facts, the computer device with power-consumption management is provided in this embodiment.

Here, an FSM (Finite State Machine) is used to describe the working state of the computer device according to the embodiment. Table 1 indicates the definitions of each state of the FSM and Table 2 indicates the meanings of the constant used in the explanations described below.

TABLE 1

| State Name | Definition |
| --- | --- |
| IDLE | Playback of video content does not start, the eye tracking module is sleeping (on standby), and waiting for a Start Key to be pressed or clicked. Consumes very little energy. |

TABLE 1-continued

| State Name | Definition |
| --- | --- |
| START | Video content playback is initiated, the eye tracking module is active and the CPU detects user's eyes. Consumes energy. |
| STANDBY | The eye tracking module is inactive and the CPU does not detect the position of user's eyes, but playback of video content is being performed. Some energy is saved compared to the 'START' state. |
| WAKEUP | The eye tracking module is active, the CPU detects the position of the user's eyes, and playback of video content is performed. Consumes the same energy as the START state. |
| CAPTURE | The eye tracking module is active, the CPU detects the position of the user's eyes, and playback of video content is performed. Consumes the same energy as the START state. |
| SLEEP | The eye tracking module is sleeping (on standby), the CPU does not detect the user's eyes, and playback of video content is paused. If the user's eyes are not detected for a certain time, then presenting video content on the display will be turned off for saving power. |

TABLE 2

| Name | Definition |
| --- | --- |
| T0 | The unit is seconds. T0 is the time after the playback of video content start, the computer device continuously checks whether the user's eyes are in the same view zone. |
| T1 | The unit is seconds. After the computer device detects the user's eyes are in the same view zone for T0 seconds, the computer device wakes up to detect if the user's eyes are in the same view zone for T1 seconds. T1 should be less than T0. |
| T2 | The unit is seconds. The CPU of the computer device does not detect user's eyes for T2 seconds. |
| T_0 | The unit is seconds. The CPU of the computer device is released for T_0 seconds for saving power. |
| T_1 | The unit is seconds. The CPU of the computer device is released for T_1 seconds for saving power. T_1 should be longer than T_0. |
| N0 | N0*T_0 means the time for the user to watch the video content in the same eye view zone. |
| N1 | If the count number comes to N1, it means that the user watches the video content in the same view zone for (N0*T_0 + (N1 − N0)*T_1) seconds. N1 should be bigger than N0. |

The transition of the working states of the computer device according to the embodiment will be described below with reference to FIGS. 3, 4 and 8 and Tables 1 and 2.

Figure 8:
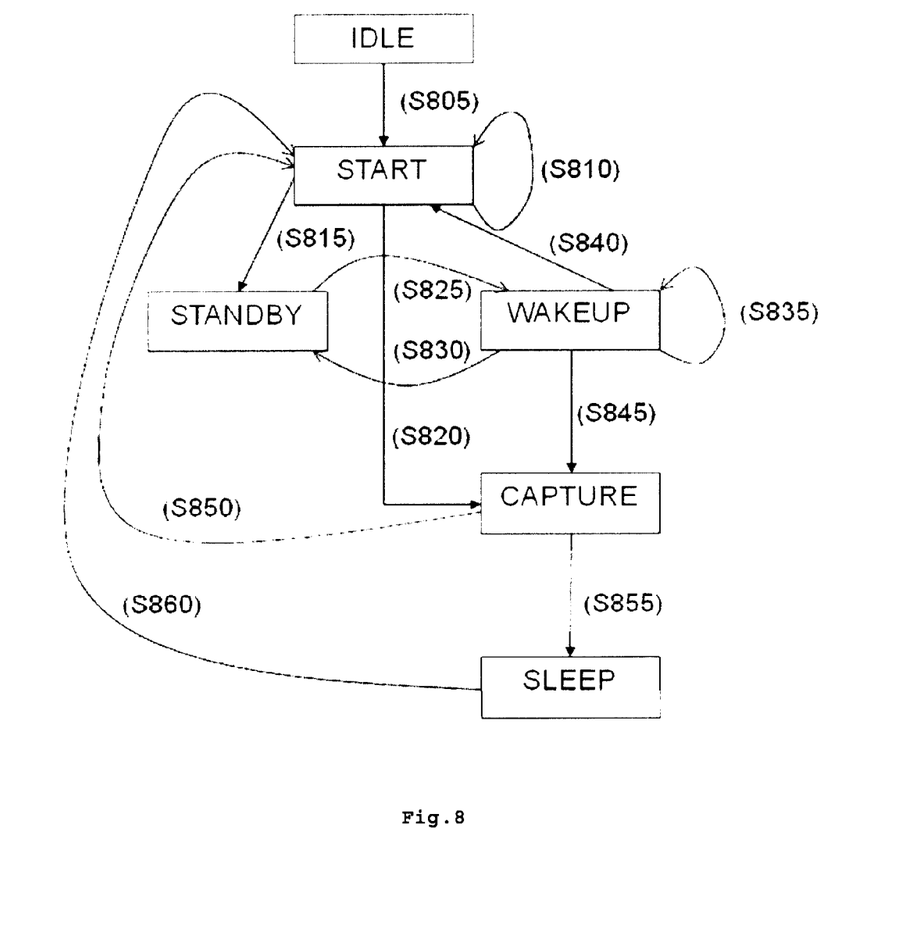
FIG. 8 is a State Transition Diagram illustrating transition of the working states of the computer device according to the embodiment.

FIG. 8 is a State Transition Diagram illustrating the transition of the working states of the computer device according to the embodiment.

At first, the computer device 300 enters into the IDLE state after the computer device 300 is switched on. In the IDLE state, playback of a video content is not started by the CPU 310, the eye tracking module 320 (the camera 410 or the depth sensor) is sleeping (on standby) and the CPU 310 is waiting for a start key of the user input module 350 to be pressed by the user or a start key icon displayed on the display 340 to be clicked by the user. In the IDLE state only little power is consumed.

At step 805 for the IDLE state, if the start key of the user input module 350 is pressed by the user or the start key icon displayed on the display 340 is clicked by the user, the computer device 300 enters into the START state. In the START state, playback of the video content is started by the CPU 310, the eye tracking module 320 (the camera 410 or the depth sensor) starts to work and the CPU 310 starts to detect the position of the user's eyes. The START state consumes more power. The detection of the user's eyes is continued for T0 seconds.

At step 810 for the START state, if it is detected that the user's eyes are in the same view zone for less than T0 seconds, the detection of the user's eyes is repeatedly continued for another T0 seconds.

At step 815 for the START state, if it is detected that the user's eyes are in the same view zone for T0 seconds, the computer device 300 enters into the STANDBY state. Every time the computer device 300 enters into the STANDBY state, a counter is incremented by the CPU 310 and the counter number is updated in the memory 360.

At step 820 for the START state, if the user's eyes are not detected at all (absent) for T0 seconds, the computer device 300 enters into the CAPTURE state. In the CAPTURE state, playback of the video content is performed by the CPU 310, the eye tracking module 320 works and the CPU 310 detects the user's eyes. When the computer device 300 enters into the CAPTURE state from the START state, the current video presentation time is recorded in the memory 360. The CAPTURE state consumes approximately the same power as the START state.

At step 825 for the STANDBY state, if the count number is less than N0, the CPU 310 and the eye tracking module 320 do not work to detect the position of the user's eyes for T_0 seconds. Also, if the count number is equal to N0 or more (but less than N1), the CPU 310 and the eye tracking module 320 do not work to detect the position of user's eyes for T_1 seconds. T_1 is longer than T_0. If the count number comes to N1, it means that the user continuously watches the video content in the same view zone at least for (N0*T_0+ (N1−N0)*T_1) seconds. N1 should be bigger than N0. When the count comes to N1, the number of the count is reset to zero.

In the STANDBY state, the CPU 310 and the eye tracking module 320 do not work to detect the position of user's eyes for T_0 or T_1 second intervals, but the CPU 310 performs playback of video content. The STANDBY state can save some power since the detection of the position of user's eyes is not performed.

As can be understood from the above-described explanation, the numbers N0 and N1 relate to the time for the user to watch the video content in the same eye view zone. The numbers N0 and N1 can be determined based on the considerations that, when the user watches the video content on the computer device 300, the user will not very frequently change the user's eyes position with respect to the computer device 300 in seconds-order, but the user may change the user's eyes position for his/her comfort in minutes-order.

After the CPU 310 and the eye tracking module 320 sleep for not detecting the position of user's eyes for T_0 or T_1 seconds, the computer device 300 enters into the WAKEUP state.

At step 830 for the WAKEUP state, it is detected if the user's eyes are in the same view zone for T1 seconds. The computer device 300 again enters into the STANDBY state, if it is detected that the user's eyes are in the same view zone for T1 seconds. T1 should be less than T0. The computer device 300 will reciprocate between the STANDBY state and the WAKEUP state as long as the positions of the user's eyes are kept in the same view zone.

At step 835 for the WAKEUP state, if it is detected that the user's eyes are in the same view zone for less than T1 seconds, the detection of the user's eyes is repeatedly continued for another T1 second interval.

At step 840 for the WAKEUP state, if it is detected that the user's eyes moved into another view zone, the computer device 300 again enters into the START state. In this START state, playback of video content is continued but the pixel arrangement on the display 340 may be switched to the pixel arrangement corresponding to the view zone into which the user's eyes moved. When the computer device 300 again enters into the START state from the WAKEUP state, the number of the count is reset to zero.

At step 845 for the WAKEUP state, if the user's eyes are not detected at all (absent) for T1 seconds, the computer device 300 enters into the CAPTURE state. When the computer device 300 enters into the CAPTURE state from the WAKEUP state, if the count number is less than N0, for example, the video presentation time, which is T_0 seconds prior to the time when the computer device 300 enters into the CAPTURE state, is recorded in the memory 360. Also, if the count number is equal to NO or more (but less than N1), for example, the video presentation time, which is T_1 seconds prior to the video playback position when the computer device 300 enters into the CAPTURE state, is recorded in the memory 360 and the count number is reset to zero.

At step 850 for the CAPTURE state, if the user's eyes are detected in less than T2 seconds after the computer device 300 enters into the CAPTURE state, the computer device 300 again enters into the START state. In this START state, playback of the video content may be resumed from the video presentation time when it is detected that the user's eyes are absent. Such video presentation time can be recorded in the same manner as described above. For example, in the case where the computer device 300 enters into the CAPTURE state from the START state (S820), playback of the video content may be resumed from the video presentation time when the computer device 300 enters into the CAPTURE state. Also, in the case where the computer device 300 enters into the CAPTURE state from the WAKEUP state (S845), playback of the video content may be resumed from the video presentation time which is T_0 or T_1 seconds prior to the time when the computer device 300 enters into the CAPTURE state.

At step 855 for the CAPTURE state, if the user's eyes are not detected at all (absent) for T2 seconds after the computer device 300 enters into the CAPTURE state, the computer device 300 enters into the SLEEP state. In the SLEEP state, the CPU 310 and the eye tracking module 320 do not work to detect the position of the user's eyes, and playback of video content is paused. If the user's eyes are not detected for a certain time after the computer device 300 enters into the SLEEP state, then presenting video content on the display 340 will be turned off to save power for the CPU 310 and the display 340.

At step 860 for the SLEEP state, if the start key of the user input module 350 is pressed by the user or the start key icon displayed on the display 340 is clicked by the user, the computer device 300 again enters into the START state. Also in this START state, the same as described in the step 850, playback of the video content may be resumed from the video presentation time when it is detected that the user's eyes are absent.

As to step 845, the view zone in which the user's eyes are detected before the user's eyes are absent may be recorded in the storage 330. Since a user generally tends to watch the display 340 in the same view zone, if such a view zone is recorded in the storage 330, the CPU 310 can start to detect the position of the user's eyes with the recorded view zone when the computer device 300 enters into the START state from the CAPTURE state (S850). Because the recorded view zone is the most probable view zone where the position of the user's eyes are to be positioned, the computational cost of the CPU 310 for detecting the position of the user's eyes may be minimized, if the position of the user's eyes is detected in the same view zone.

In addition to the above-described functions of the computer device 300, the computer device 300 may be configured so that the user can switch between 3D representation mode and 2D representation mode. The 2D representation mode can be realized by only presenting left views or right views of the video content on the all pixels of the display 340, for example. In the 2D representation mode, detection of the user's eyes by the eye tracking module 320 and the CPU 310 is not required. Therefore, further reduction of power-consumption on the computer device 300 can be achieved if user switches to 2D representation mode. 2D representation mode may be chosen when the battery of the computer device 300 is low, for example.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A device for managing power consumption comprising:
   a detector for detecting an eye in one of a plurality of view zones; and
   a processor configured to:
   determine if a position of the eye is kept in the one of the plurality of view zones for a first time period; and
   if the position of the eye is kept in the one of the plurality of view zones for the first time period, reproduce a video content and suspend detecting the eye and determining the position of the eye for a second time period thereby reducing the power consumption of the device;
   present for display a stereoscopic image including left and right views in the plurality of view zones, the plurality of view zones including alternately arranged first and second view zones in which the first view zone includes the left view to be presented to a left eye and the right view to be presented to a right eye and the second view zone includes the left view to be presented to the right eye and the right view to be presented to the left eye;
   determine if the position of the eye moves from the first view zone into the second view zone; and
   if it is determined that the position of the eye moves from the first view zone into the second view zone, switch the arrangement of left and right views in the second view zone to be displayed on the display so that the left view is presented to left eye and the right view is presented to right eye.

2. The device according to claim 1, wherein the processor is further configured to:
   after the second time period, repeat determining if the position of the eye is kept in the one of the plurality of view zones for the first time period and, if the position of the eye is kept in the one of the plurality of view zones for the first time period, suspend for the second time period detecting the eye and determining the position of the eye.

3. The device according to claim 2, wherein the processor is further configured to:
   reproduce a content even while the processor suspends detecting the eye and determining the position of the eye during the second time period.

4. The device according to claim 1, wherein the processor is further configured to:
   if the eye is not detected for a third time period, suspend detecting the eye and determining the position of the eye in the one of the plurality of view zones and pause reproducing of the video content.

5. A method of managing power consumption comprising:
   detecting an eye in one of a plurality of view zones;
   determining if a position of the eye is kept in the one of the plurality of view zones for a first time period;
   if the position of the eye is kept in the one of the plurality of the view zones for the first time period, reproducing a video content and suspending detecting the eye and determining the position of the eye for a second time period thereby reducing the power consumption of the device
   displaying on a display a stereoscopic image including left and right views in several view zones, the several view zones including alternately arranged first and second view zones in which the first view zone includes the left view to be presented to a left eye and the right view to be presented to a right eye and the second view zone includes the left view to be presented to the right eye and the right view to be presented to left eye;
   determining if the position of the eye moves from the first view zone into the second view zone; and
   if it is determined that the position of the eye moves from the first view zone into the second view zone, switching the arrangement of left and right views to be displayed on the display so that the left view is presented to the left eye and the right view is presented to the right eye.

6. The method according to claim 5, further comprising repeating, after the second time period, determining if the position of the eye is kept in the one of the plurality of view zones for the first time period and, if the position of the eye is kept in the one of the plurality of view zones for the first time period, suspending for the second time period detecting the eye and determining the position of the eye.

7. The method according to claim 5, further comprising reproducing a content even while suspending detecting the eye and determining the position of the eye during the second time period.

8. The method according to claim 5, further comprising if the eye is not detected in one of the plurality of the view zones for a third time period, suspending detecting the eye and determining the position of the eye, and pausing reproducing of the video content.

9. A non-transitory storage medium readable by a computer, the storage medium storing a program for a device comprising:
   a detector for detecting an eye in one of a plurality of view zones; and
   a processor,
   the program causing the processor to:
   determine if the position of the eye is kept in the one of the plurality of the view zones for a first time period; and
   if the position of the eye is kept in the one of the plurality of the view zones for the first time period, reproduce a video content and suspend detecting the eye and determining the position of the eye for a second time period thereby reducing the power consumption of the device;
   display on a display a stereoscopic image including left and right views in several view zones, the several view zones including alternately arranged first and second view zones in which the first view zone includes the left view to be presented to a left eye and the right view to be presented to a right eye and the second view zone includes the left view to be presented to the right eye and the right view to be presented to left eye,
   determine if the position of the eye moves from the first view zone into the second view zone; and
   if it is determined that the position of the eye moves from the first view zone into the second view zone, switch the arrangement of left and right views to be displayed on the display so that the left view is presented to the left eye and the right view is presented to the right eye.

* * * * *